US010616777B2

(12) United States Patent
Lau

(10) Patent No.: US 10,616,777 B2
(45) Date of Patent: Apr. 7, 2020

(54) SYSTEMS AND METHODS FOR IMPROVED CELLULAR QUALITY OF EXPERIENCE

(71) Applicant: T-Mobile USA, Inc., Bellevue, WA (US)

(72) Inventor: Kevin Lau, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/413,803

(22) Filed: Jan. 24, 2017

(65) Prior Publication Data
US 2017/0134972 A1 May 11, 2017

Related U.S. Application Data

(62) Division of application No. 14/570,932, filed on Dec. 15, 2014, now Pat. No. 9,585,030.

(51) Int. Cl.
*H04W 24/08* (2009.01)
*H04W 24/02* (2009.01)
(Continued)

(52) U.S. Cl.
CPC .......... *H04W 24/02* (2013.01); *G06F 3/0484* (2013.01); *G06F 16/29* (2019.01); *G06F 16/904* (2019.01);
(Continued)

(58) Field of Classification Search
CPC ....... H04W 64/00; H04W 16/18; H04W 4/02; H04L 41/5067; H04L 65/80;
(Continued)

(56) References Cited

U.S. PATENT DOCUMENTS

2007/0010259 A1  1/2007  Hoffmann
2008/0104228 A1  5/2008  Dacosta
(Continued)

FOREIGN PATENT DOCUMENTS

CN  102711162  10/2012
WO  WO2013030868  3/2013
WO  WO2013186980  12/2013

OTHER PUBLICATIONS

PCT Search Report and Written Opinion dated Feb. 24, 2016 for PCT application No. PCT/US2015/061224, 14 pages.
(Continued)

*Primary Examiner* — Quan M Hua
(74) *Attorney, Agent, or Firm* — Lee & Hayes, P.C.

(57) ABSTRACT

Systems and methods for providing an improved cellular user quality of experience (QoE) are disclosed. The system can comprise a database from multiple data points to monitor and analyze cellular user experiences holistically. The system supplements conventional quality of service (QoS) metrics with user-side, application provider, and internet provider data, among other things. The data can be used to create highly granular service maps. The data can also be used in methods for analyzing and solving network issues, including slowdowns, dropped calls, and network availability are also disclosed. Improved analysis of network, user equipment (UE), and application issues can locate and solve QoE issues, improving cellular customer satisfaction, retention, and loyalty.

20 Claims, 11 Drawing Sheets

(51) Int. Cl.
*G06F 3/0484* (2013.01)
*H04L 12/24* (2006.01)
*G06F 16/29* (2019.01)
*G06F 16/904* (2019.01)
*G06F 16/9537* (2019.01)
*H04W 24/10* (2009.01)
*H04W 24/04* (2009.01)
*H04M 1/725* (2006.01)
*H04W 84/12* (2009.01)
*H04W 88/02* (2009.01)

(52) U.S. Cl.
CPC ........ *G06F 16/9537* (2019.01); *H04L 41/147* (2013.01); *H04L 41/5067* (2013.01); *H04W 24/04* (2013.01); *H04W 24/10* (2013.01); *H04M 1/72586* (2013.01); *H04W 84/12* (2013.01); *H04W 88/02* (2013.01)

(58) Field of Classification Search
CPC ....... H04L 41/147; H04L 41/18; H04L 41/22; H04L 43/045; H04L 67/18; H04N 21/64738
See application file for complete search history.

(56) References Cited

U.S. PATENT DOCUMENTS

| | | |
|---|---|---|
| 2009/0296827 A1 | 12/2009 | Karaoguz et al. |
| 2011/0149775 A1 | 6/2011 | Lee et al. |
| 2012/0276867 A1 | 11/2012 | McNamee et al. |
| 2013/0054791 A1 | 2/2013 | Oki et al. |
| 2013/0263167 A1 | 10/2013 | Parthasarathy et al. |
| 2014/0100919 A1 | 4/2014 | Taff |
| 2014/0149573 A1* | 5/2014 | Tofighbakhsh ....... H04L 69/329 709/224 |
| 2014/0329471 A1* | 11/2014 | Bartlett .................. H04L 43/08 455/67.14 |
| 2015/0148064 A1* | 5/2015 | Tsuda ..................... G01C 21/32 455/456.1 |
| 2016/0174081 A1 | 6/2016 | Lau |

OTHER PUBLICATIONS

Extended European Search Report dated Nov. 28, 2018, for European Patent Application No. 18197798.4, 17 pages.
Chinese Office Action dated Oct. 8, 2019 for Chinese Patent Application No. 201580068264.3, a counterpart of U.S. Pat. No. 9,585,030.

* cited by examiner

SYSTEMS AND METHODS FOR IMPROVED
CELLULAR QUALITY OF EXPERIENCE

CROSS-REFERENCE TO RELATED APPLICATION

This application is a divisional of, claims priority to, and benefit under 35 U.S.C. § 121 to, U.S. patent application Ser. No. 14/570,932, filed Dec. 15, 2014, of the same title, which is hereby incorporated by reference in its entirety as if set forth fully below.

BACKGROUND

The combination of cellular technology and modern smart phones, among other things, has created an explosion in the volume of data that is provided wirelessly to users. Various applications including, for example, Facebook®, You Tube®, voice calling, and texting all require digital bandwidth. This data can be provided over various cellular networks (e.g., 2G, 3G, 4G, and 4G LTE) and can also be provided, or augmented, by various wireless networks (e.g., 802.11b/g/n).

Conventionally, the quality of a user's cellular experience has been measured using quality of service (QoS) metrics. These tend to be objective, technical, network measurements and can include, for example and not limitation, signal strength, error rates, bandwidth, throughput, transmission delay, availability, and jitter. And while these metrics can accurately measure the objective performance of a network, network performance does not necessarily translate into quality of experience (QoE) for the user.

If, for example, a user attends a football game at a stadium with multiple cellular access points, QoS metrics may indicate that the user has excellent signal, and that the system has enormous throughput (due to multiple access points). If a large number of people in the stadium are using their phones simultaneously, however, the user may nonetheless experience dropped calls, slow download speeds, and/or sluggish response from various applications. Thus, many users may have a poor QoE despite the fact that QoS metrics indicate that the system is operating nominally. As a result, QoS metrics do not and cannot address some important issues.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
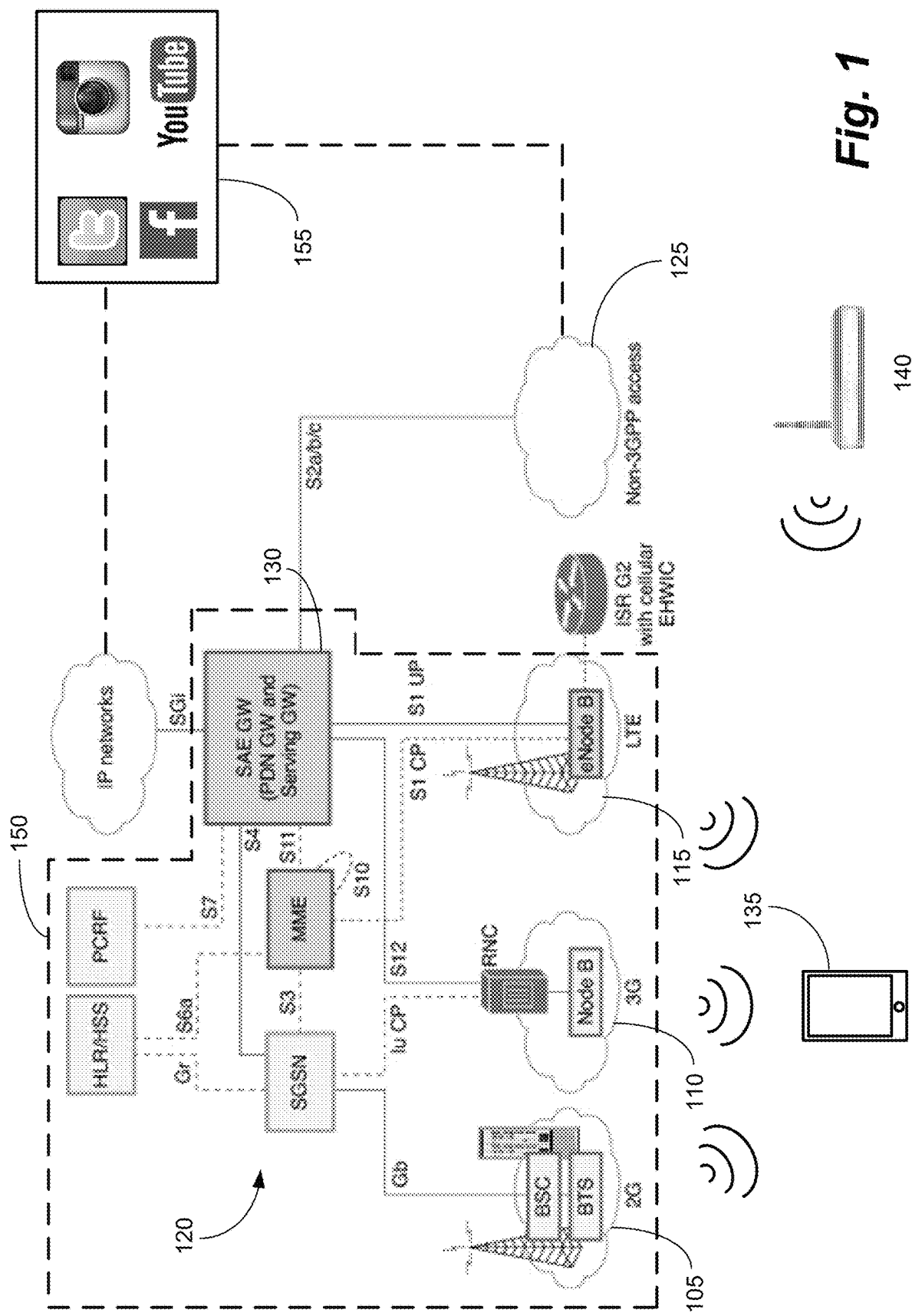
FIG. 1 is a schematic of a conventional cellular/wireless network.

Examples of the present disclosure relate generally to cellular user quality of experience (QoE), and specifically to systems and methods for measuring, tracking, and improving user's QoE using multiple metrics. In some examples, the system can comprise an application on the user's equipment (UE) to measure user side network response times, and processor and memory usage, for example, to enable the system to pinpoint causes of poor QoE. In some examples, the system can combine elements of QoE data with quality of service (QoS) data to identify problems and offer solutions. The system can also include one or more user interfaces that provide indications of current QoE conditions to users.

To simplify and clarify explanation, the disclosure is described herein as a system and method for analyzing, tracking, and fixing issues related to a user's cellular QoE. One skilled in the art will recognize, however, that the disclosure is not so limited. The system can also be used, for example and not limitation, with other types of networks, including other wireless and wired networks. In addition, the disclosure provided below is related to current cellular technologies (e.g., 2G, 3G, 4G, and 4G LTE (Long Term Evolution)), but is equally applicable to other network technologies, including technologies developed after this disclosure.

The metrics, methods, and steps described hereinafter as making up the various elements of the present disclosure are intended to be illustrative and not restrictive. Many suitable datasets, applications, and networks that would perform the same or a similar function as the systems described herein are intended to be embraced within the scope of the disclosure. Such other systems and methods not described herein can include, but are not limited to, systems, networks, and technologies that are developed after the time of the development of the disclosure.

QoS, generally speaking, is the monitoring of the specific infrastructure components such as, for example and not limitation, servers, routers, or network traffic (e.g., IP packets, transport stream, etc.). QoS metrics are generally device or transport-oriented and thus measure objective factors including, for example, CPU, memory use, packet loss, delay, or jitter.

Unfortunately, QoS cannot evaluate the quality of the network as seen and perceived by the end user. Because current infrastructures are designed to be robust and redundant—with back-up services, alternative network routing, and error correction—problems on the network or device layer do not necessarily cause a service-layer issue for the end user. Alerts triggered because a router is down might not signify a service outage for the user, especially if traffic is correctly rerouted, but may result in delays for the user.

QoE performance indicators, on the other hand, are user-centric. They include metrics such as, for example and not limitation, time to download a webpage, access an application, place a phone call, change a TV channel, log into an interactive service, and measuring video & audio quality. This helps take the guesswork out of impact assessment and provides factual information to, for example, drive operations, prioritize investments (e.g., in infrastructure), and for UE selection.

One way to evaluate the quality delivered to a user is for the provider to connect to the service like a user. Unfortunately, due to the number of different types of users, UE, locations, and infrastructures involved, it is difficult to collect enough data to make this a meaningful exercise. Another solution, using a multipronged approach, can include an application on the UE to monitor user-side experience combined with data from, for example, internet service providers (ISPs), content providers (e.g., Facebook, YouTube, etc.), and even direct input from users.

Of course, both QoE, for subscriber-level monitoring, and QoS, for equipment troubleshooting and root-cause analysis, can be used cooperatively to maximize customer experience.

As mentioned above, conventional network analysis tends to rely on purely technical QoS metrics. These systems use metrics such as signal strength, error rates, bandwidth, throughput, transmission delay, availability, and jitter. The cellular and wireless networks in use today, however, have many components outside the cellular network itself. In addition, QoS metrics are often unable to identify certain issues because they are not capable of measuring overall system performance. In other words, QoS metrics are unable to measure the overall performance of the system, from the user's perspective, precisely because they do not monitor many components outside the cellular network.

A user may be frustrated with the speed of service in a large stadium due to the sheer number of users on the same network. With respect to QoS metrics, however, the system may appear to be operating nominally[1], if at higher than normal usage rates. In addition, if a user experiences a dropped call, for example, but hangs up their handset within a predetermined time period (e.g., 30 seconds), a QoS system may nonetheless register a successful call because no UE-side data is available. There are many such instances where the QoS system indicates good QoS, yet the user experiences poor QoE.

[1] Nominal is used here in the engineering sense. In other words, a system is operating nominally if, for example, it is operating at a predetermined download speed plus or minus some tolerance (e.g. 20 Mbps±2 Mbps). Because different types of networks have widely different data and error rates, this term is not intended to be limiting, but merely to convey a range of normal operation.

From a client retention and satisfaction standpoint, it is QoE that is more important than QoS. In other words, a user with a dropped call does not care that the network appears, from a QoS standpoint, to be operating nominally. All the user knows is that their call dropped. Dropped calls are a major cause for users switching from one cellular carrier to another, for example. Similarly, if a user has "five bars" showing on his cell phone, but his phone takes ten minutes to download an e-mail, he will be similarly dissatisfied.

To this end, examples of the present disclosure relate to systems and methods for combining QoS and QoE metrics, among other things, to locate and eliminate system bottlenecks and/or offer alternative configurations. The system can comprise one or more applications on the UE to provide user-side data. The system can also collect data from cellular network providers (e.g., T-Mobile) and network content providers (e.g., Facebook and YouTube), and survey data from the user. In some examples, the system can provide one or more graphical user interfaces (GUIs) to provide users with real-time performance data for one or more networks and/or applications. In other examples, the system can offer highly granular performance maps to enable consumers to solve network issues or make equipment and provider choices. Examples of the present disclosure can also comprise a method directed to the analysis of multiple data sources to locate, and suggest solutions for, network bottlenecks.

FIG. 1 depicts a conventional cellular network including 2G 105, 3G 110, and 4G LTE 115 components. As is known in the art, data can be routed from the internet or other sources using a circuit switched modem connection (or non-3GPP connection) 120, which provides relatively low data rates, or via IP based packet switched 125 connections, which results is higher bandwidth. The LTE system 115, which is purely IP based, essentially "flattens" the architecture, with data going straight from the internet to the Service Architecture Evolution Gateway (SAE GW) 130 to evolved Node B transceivers 115, enabling higher throughput. Many UEs 135 also have wireless local area network (WLAN) 140 capabilities, in some cases enabling even higher throughput.

QoS systems 150 generally only cover the cellular system side components (e.g., gateways 130, towers 115, etc.). Notably, one major component that is outside the purview of the QoS system 150 is the UE 135. This can include a wide variety of phones, smart phones, tablets, and computers and can also include a wide variety of operating systems (e.g., Windows, iOS, Android, etc.). UE also includes a wide variety of physical layouts, which can affect, for example, antenna reception, processor speed, and battery life. Thus, because conventional QoS techniques are not capable of monitoring errors and issues arising from UE 135, a major diagnostic component is missing from the system.

In addition, application providers 155 such as, for example and not limitation, Twitter, Facebook, Instagram, and You Tube provide mobile applications for use on UE 135. Some, like You Tube, require relatively high data bandwidth to stream or download videos, for example, but are less dependent on response times. Others, like online games, may instead require fast response times and fast cellular handovers (i.e., handing the UE 135 from one cellular tower 115 to the next as the user travels) to maintain continuity of play. Still other applications, such as making voice calls, have much lower bandwidth demands, but may require very low error rates to prevent dropped calls and audio artifacts, for example.

Each of these applications can be easily handled by a strong 4G LTE connection. Unfortunately, the equipment required to provide 4G LTE coverage has not yet been fully deployed and thus, a 4G LTE network is not always available. This also does not address the stadium issue, mentioned above, because there are limits to the number of users any network can handle. In addition, in certain areas, geological, electrical, and meteorological conditions may block or interfere with signals. Thus, in some cases, it may be beneficial to use legacy 2G or 3G connections, which may be underutilized because, for example, they are thought to be outdated. In some cases, it may also be useful to supplement or replace cellular bandwidth with WLAN 140 bandwidth. As discussed below, examples of the present disclosure can enable cellular service providers to classify users, identify needs, locate bottlenecks, and offer solutions to network issues.

As mentioned above, a problem with a conventional QoS system 150 is that it does not take into account all, or even most, of the variables that can cause issues. The QoS system 150 does not monitor UE 135 side issues, for example. Thus, if a particular phone or application is causing issues, the QoS system 150 is unable to detect these issues. Similarly, the QoS system 150 does not receive data from application providers 155. Thus, the QoS system 150 may be capable of providing high speed and bandwidth, but Application A is nonetheless dragging on the UE 135. Unfortunately for cellular service providers, the user does not know (or care) where the problem lies, they just want things to work.

Figure 2:
FIG. 2 is a schematic of a conventional cellular coverage map.

As a result, different applications may be more or less suitable for different connection types and vice-versa. To aid in decision making and problem solving, therefore, examples of the present disclosure can comprise a highly granular, or even personalized, service map. As shown in FIG. 2, conventional coverage maps are useful, but tend to only show general swathes of information. The map may not provide information with high enough granularity to determine that although you live in an area with generally good coverage, for example, you and your neighbor's house are located behind a hill that almost entirely blocks the signal. Similarly, the wiring and construction of some houses can block a significant portion of cellular signals.

Figure 3A:
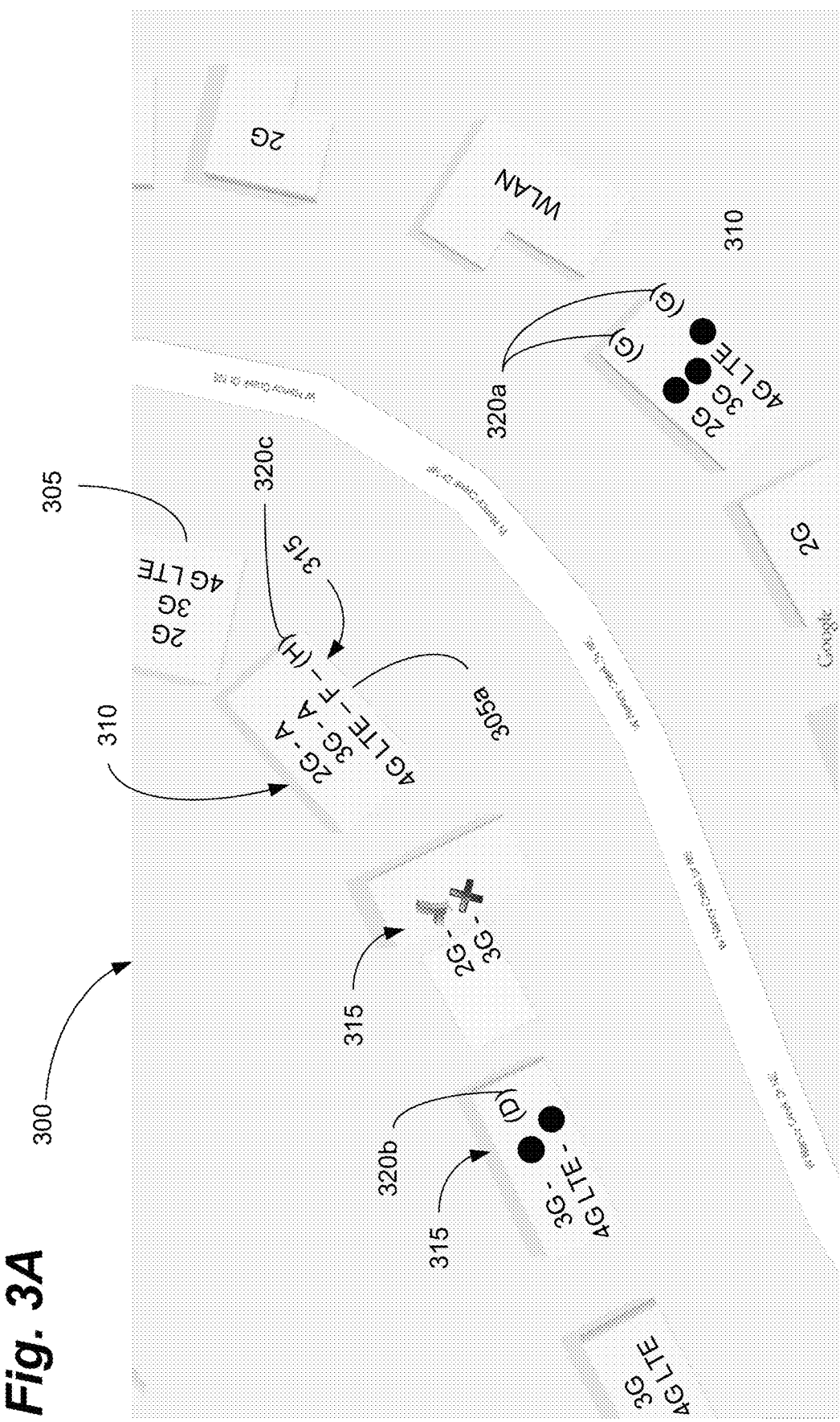
FIG. 3A is a schematic of a cellular network performance map, in accordance with some examples of the present disclosure.

To this end, data collected from individual users, cellular providers, and content providers can be aggregated into a database that can be used to create a highly granular map. As shown in FIG. 3A, for example, the map can include multiple network types 310 and, in some examples, can be granular down the individual location 305 level. The map 300 can use a combination of QoS and QoE metrics (the "combined data") to provide a predicted QoE for users in that location. In other words, QoS metrics may indicate that a user would have full 4G LTE access at a particular location. QoE metrics from previous or contiguous users, however, may indicate geographical issues or other anomalies that prevent acceptable 4G LTE coverage.

As a result, in some examples, the map 300 can show only network types that are predicted to be available in a particular location or at a particular location 305 based on the combined data. Locations can comprise many particular locations where data regarding cellular service is helpful such as, for example and not limitation, houses, buildings, businesses, and a variety of public use areas (e.g., parks and airports, for example, with public access). In other examples, the map 300 can provide network performance predictors 315, such as grades (e.g., A, B, C, D, and F), red light/green light, check marks, or other network performance predictors 315 for the various networks available at a particular location.

4G LTE coverage at a particular location 305a may provide a poor QoE, for example, but 2G and 3G QoE is excellent. This can be caused by the location 305a itself, geographical conditions, because the 3G network uses a different cell tower, or other technical reasons. These anomalies, however, are not detected from the network, or QoS, side, but can be readily detected using QoE metrics. If the user in question makes predominantly voice calls, therefore, they may be well served by the 3G network. If the user is a heavy data user, on the other hand, they may decide to use a WLAN connection at home, which sidesteps the 4G LTE coverage issue.

Conversely, the map can enable the service provider (e.g., T-Mobile) to determine if network modifications are required or if the problem is out of their control (e.g., geographical or meteorological). In other words, due to the high granularity of the map 300 and the added input from the UE and/or the user, the service provider can determine whether a coverage issue is widespread, localized, or even a particular location 305. If the issue is widespread despite the presence of a sufficient number of cell towers, for example, the service provider may decide to install additional cell towers. If, on the other hand, the issue is localized or individual, the service provider may decide to provide wireless routers, for example, to affected customers.

In some examples, the map 300 can also include network issue predictors 320. If, based on user experience with download times, throughput times, or other factors, a particular network type does not generally operate nominally in a particular location (i.e., response time is slow, throughput is low, etc.), for example, the map 300 can display the cause, if known. The map 300 can have a geographical issue indicator 320a indicating that a geographical problem exists. This can be due to the local topography, large buildings, or other physical features that block cellular signals. Similarly, if the issue is caused by distance, though the QoS metrics would indicate otherwise, for example, the map 300 can display a distance issue indicator 320b. This may be due to local interference sources, for example, that reduce the effective range of the cellular system in that area despite the fact that a location is within the normal operating range for that cellular system.

Because of the granularity of the map 300, the map 300 can also have a location issue indicator 320c. In other words, if a particular location 305 should have good reception, based on the locations 305 around it, signal strength at the location 305, and/or other factors, but does not, the location 305 itself may be causing the issue. This could be due to wiring, construction, or other factors in the location, for example, blocking cell signals (e.g., the wiring in the house may effectively create a Faraday cage). In this case, the map 300 can display the location issue indicator 320c prompting the user to investigate further.

In other embodiments, the map 300 may be customized for the type of UE 135. If QoE issues have been reported in the location 305, for example, but only for a particular UE (e.g., Device A); the map 300 can be tailored to the user with this type of UE 135. In other words, the map 300 can display one set of predictors 315, 320 for Device A and another set for Device B. In this manner, a user is not disappointed by poor QoE due to an underlying UE 135 issue.

Figure 3B:
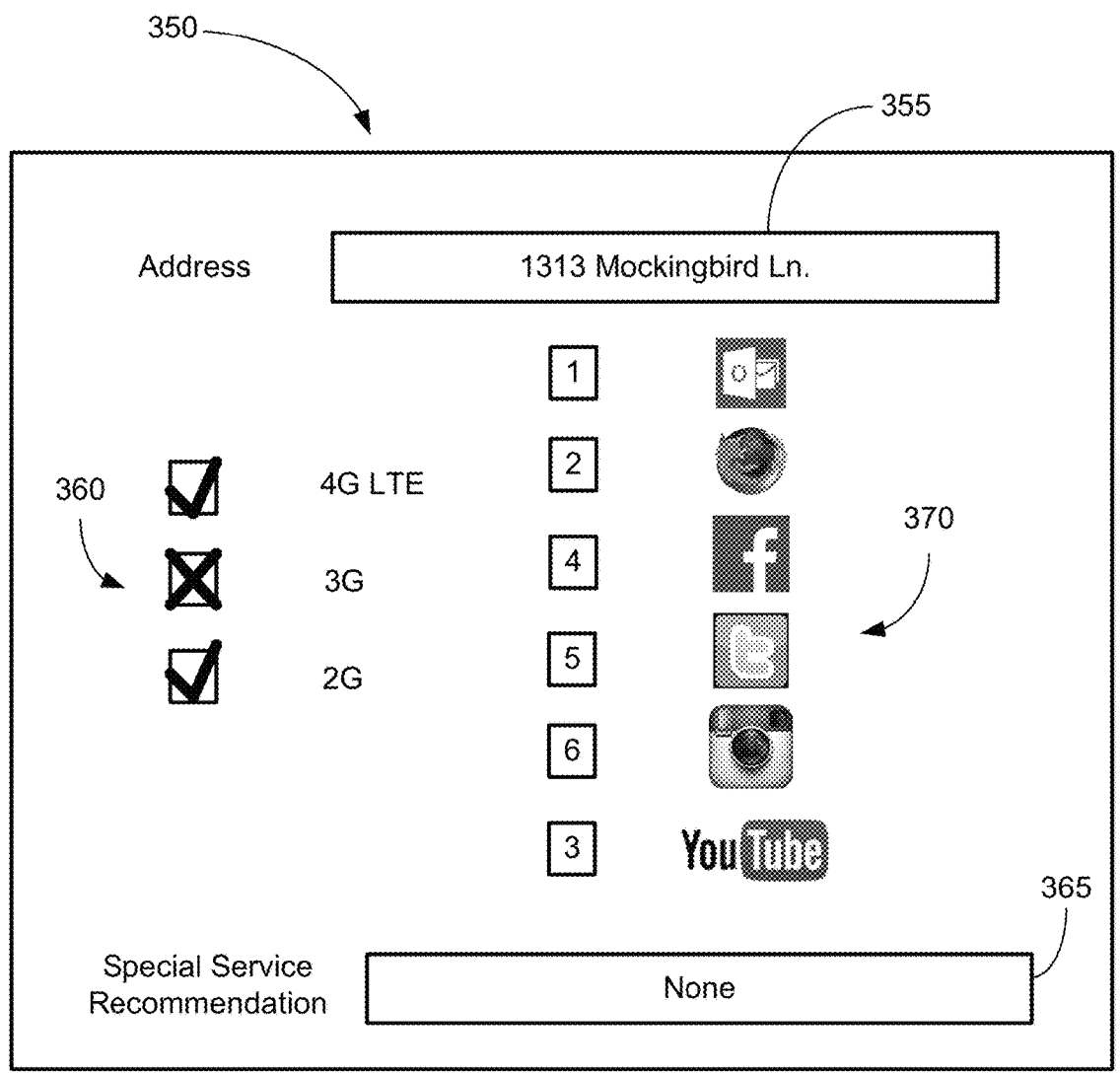
FIG. 3B is a graphical user interface for providing a user's cellular performance and service recommendations, in accordance with some examples of the present disclosure.
Figure 3C:
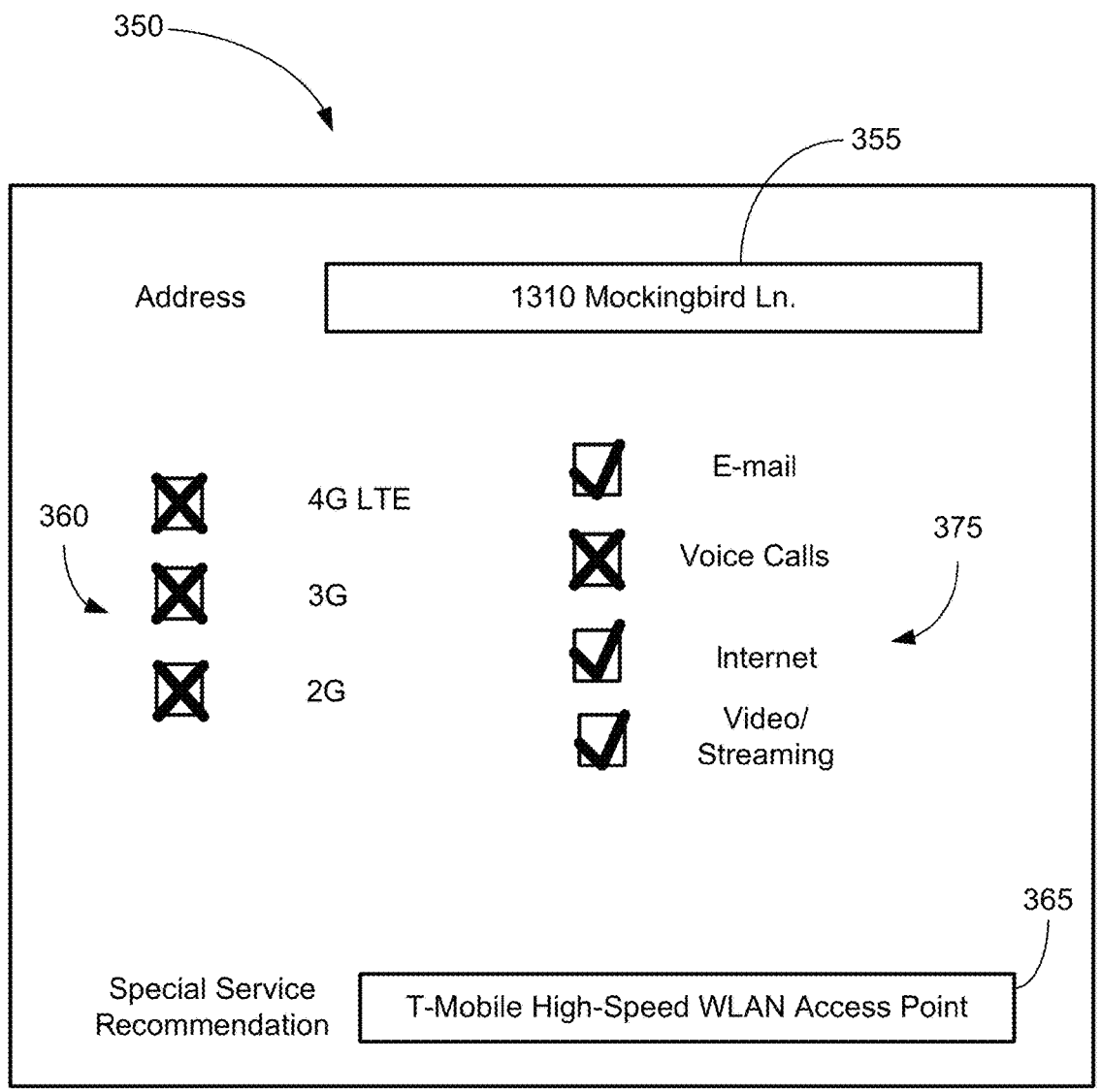
FIG. 3C is another graphical user interface for providing a user's cellular performance and service recommendations, in accordance with some examples of the present disclosure.

In other examples, as shown in FIGS. 3B and 3C, the system can comprise a GUI 350 to enable the user to enter their address and receive feedback for coverage at their house. So, for example, the user can enter their address in an address field 355 and receive feedback 360 based on the combined data as to which networks are available and will operate in a satisfactory manner. In some examples, the feedback 360 can comprise a simple check mark or x-mark, as shown. In other examples, the feedback 360 can comprise, for example and not limitation, a signal meter, a red light/yellow light/green light indicator, or a grade.

In some examples, the GUI 350 can also comprise one or more inputs regarding the user's cellular habits. In some examples, as shown in FIG. 3B, the inputs can comprise a list of applications 370 that the user is asked to rank. The applications 370 can include, for example, e-mail and internet browser applications, social media sites, and video channels. In other examples, the user can simply be asked to rank the type of data 375 they use most, as shown in FIG. 3C. The types of data 375 can comprise, for example and not limitation, voice calls, e-mail, internet, and video. In still other examples, the user can simply indicate what applications or types of data they use with a check mark or other indicator.

If applicable, the GUI 350 can also comprise a special service recommendation 365. If, as shown in FIG. 3B, based on the combined data the user is predicted to have strong 4G LTE coverage at his location 305, for example, no special service recommendation 365 may be required because the user should have excellent functionality. If, on the other hand, as shown in FIG. 3C, the user is a heavy data user and is predicted to have poor data network coverage, the special service recommendation 365 can include a WLAN connection, wireless hotspot, or other solution to provide the desired network performance.

Figure 4A:
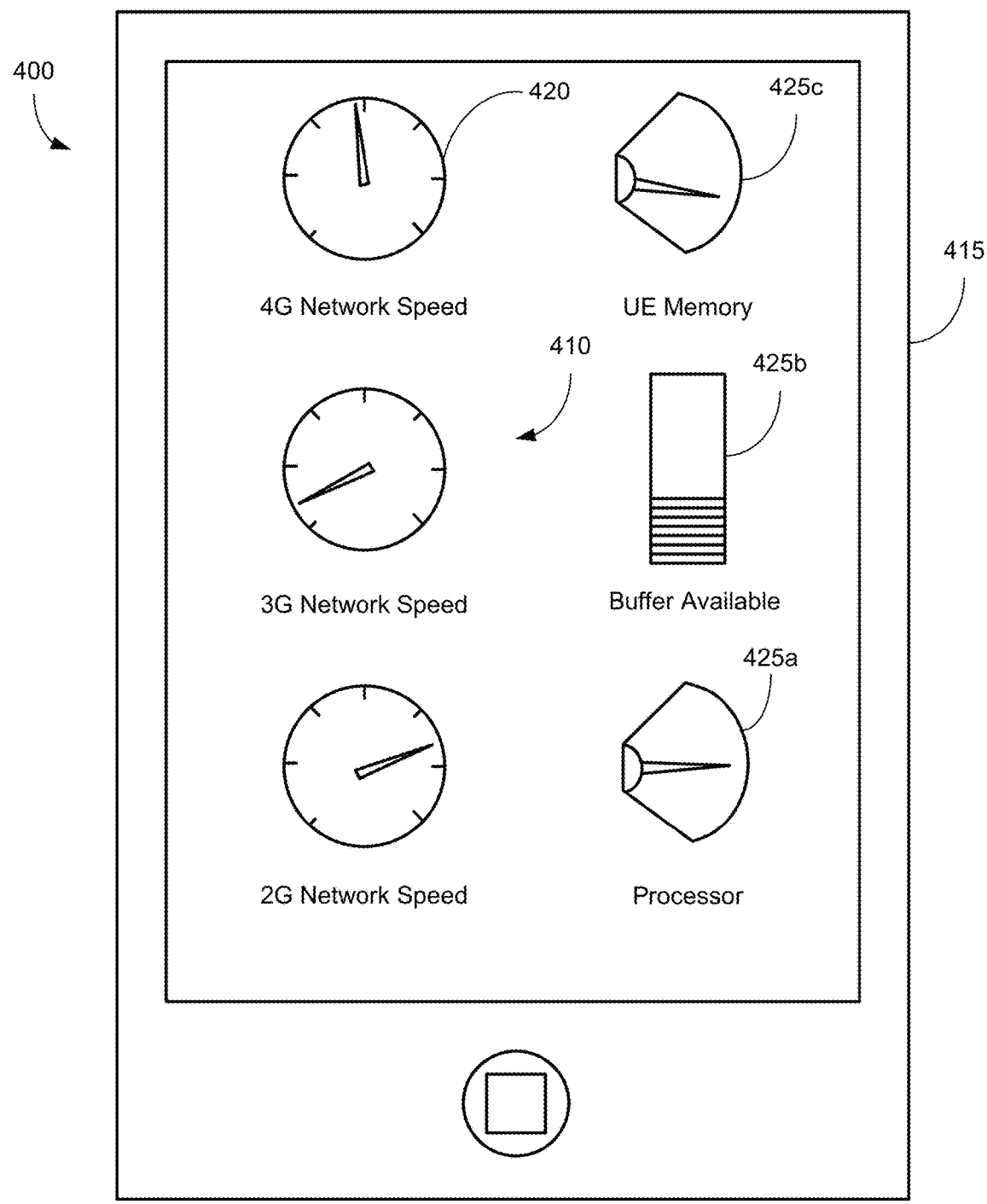
FIG. 4A is a graphical user interface for providing a user's equipment and network performance, in accordance with some examples of the present disclosure.

Examples of the present disclosure can also comprise a GUI 400 to provide real time, or almost real time, statuses of one or more applications 405 or network interfaces 410 on the UE 415 based on the combined data. As shown in FIG. 4A, for example, in some examples, the GUI 400 can essentially comprise a "dashboard" on the UE for various network connections, for example. The GUI 400 can provide a speedometer 420, fuel gauge 425, or other similar representation to depict predictions for the current status of network speeds, response times, available bandwidth, error rates, etc. These metrics can be based on, for example, actual measured performance combined with UE data and/or feedback from users proximate the user. In some examples, the GUI 400 can provide these metrics for, for example and not limitation, available 2G, 3G, 4G LTE, and WLAN networks.

The GUI 400 can also include fuel gauges 425, or other indicators, for on-board UE 415 metrics such as, for example and not limitation, processor usage 425a, available buffer 425b, and available memory 425c. Thus, if a user experiences slow response when using Application A, for example, the GUI 400 may indicate that there is little or no remaining buffer 425b causing Application A to stop and rebuffer excessively. The user may wish to restart his phone, stop other applications, or create a larger page file, if possible. Similarly, if the GUI 400 indicates excessive processor usage 425a, the user may again wish to stop unused applications or restart. If the user's processor is persistently overworked (e.g., he is a gamer or simply has an older phone), he may wish to upgrade his UE 415 to one with a more powerful processor.

Figure 4B:
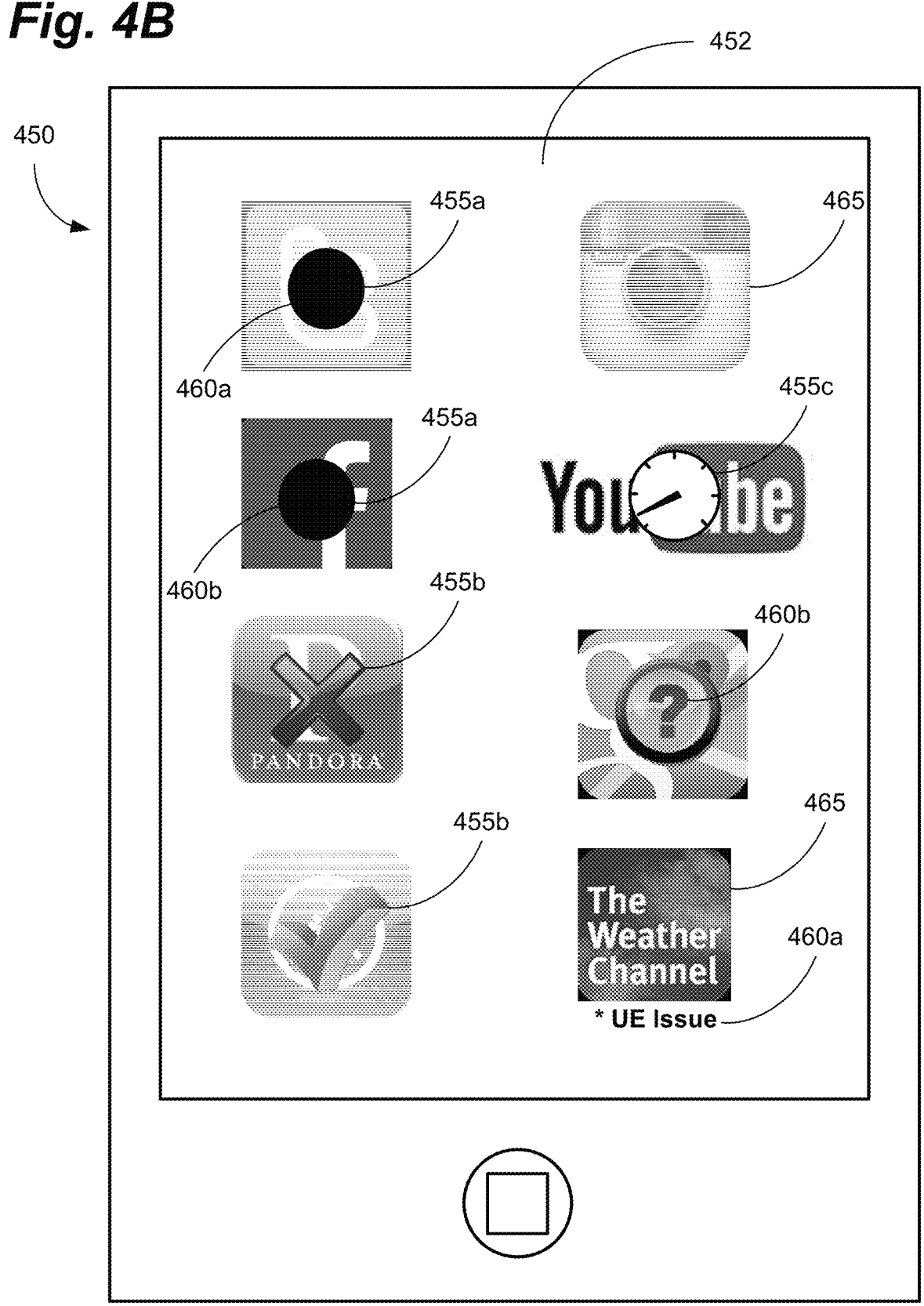
FIG. 4B is a graphical user interface for providing a user's application performance, in accordance with some examples of the present disclosure.
Figure 5:
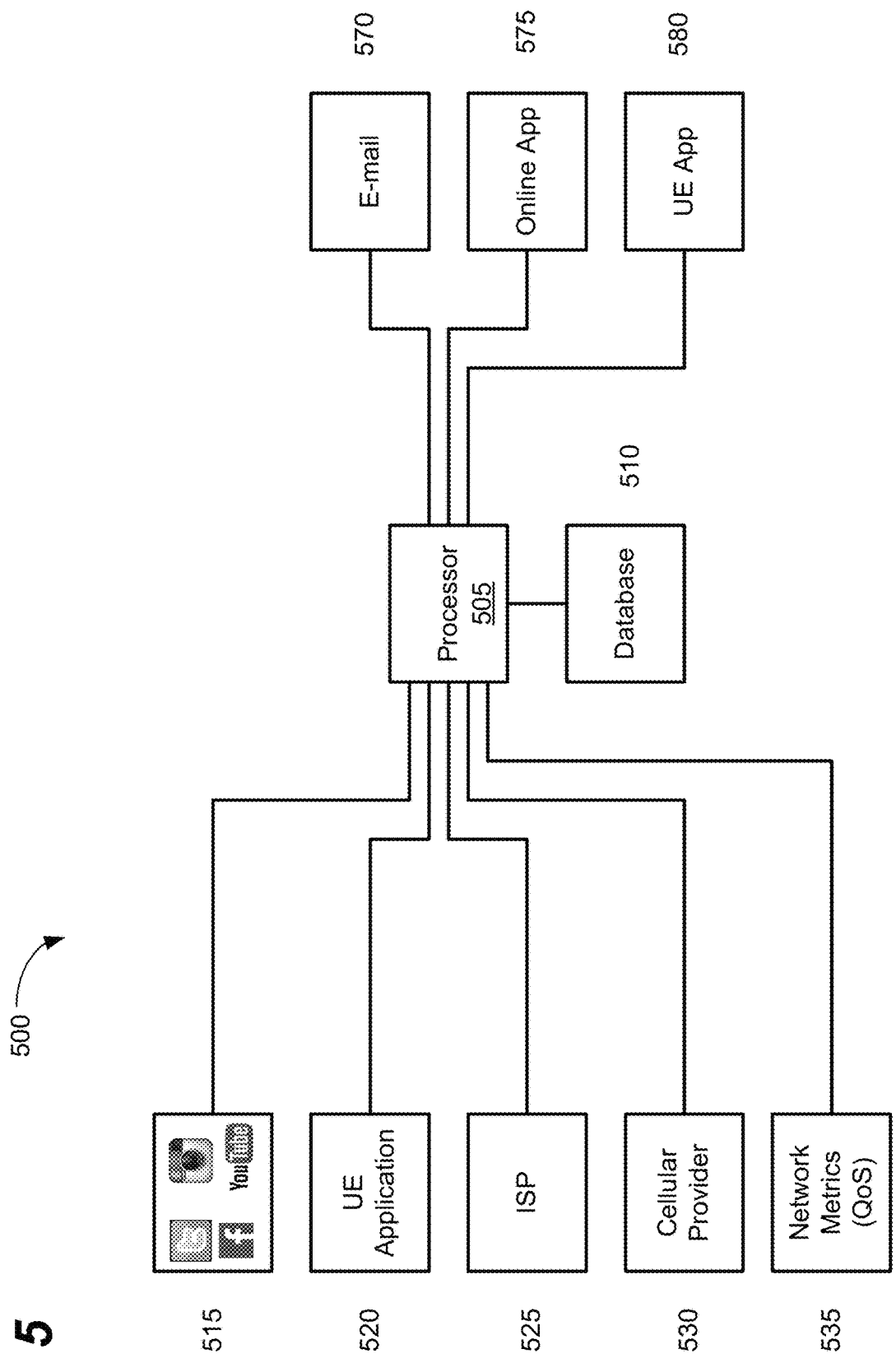
FIG. 5 is a system diagram for a system for gathering and compiling data related to overall cellular quality of experience (QoE), in accordance with some examples of the present disclosure.
Figure 6:
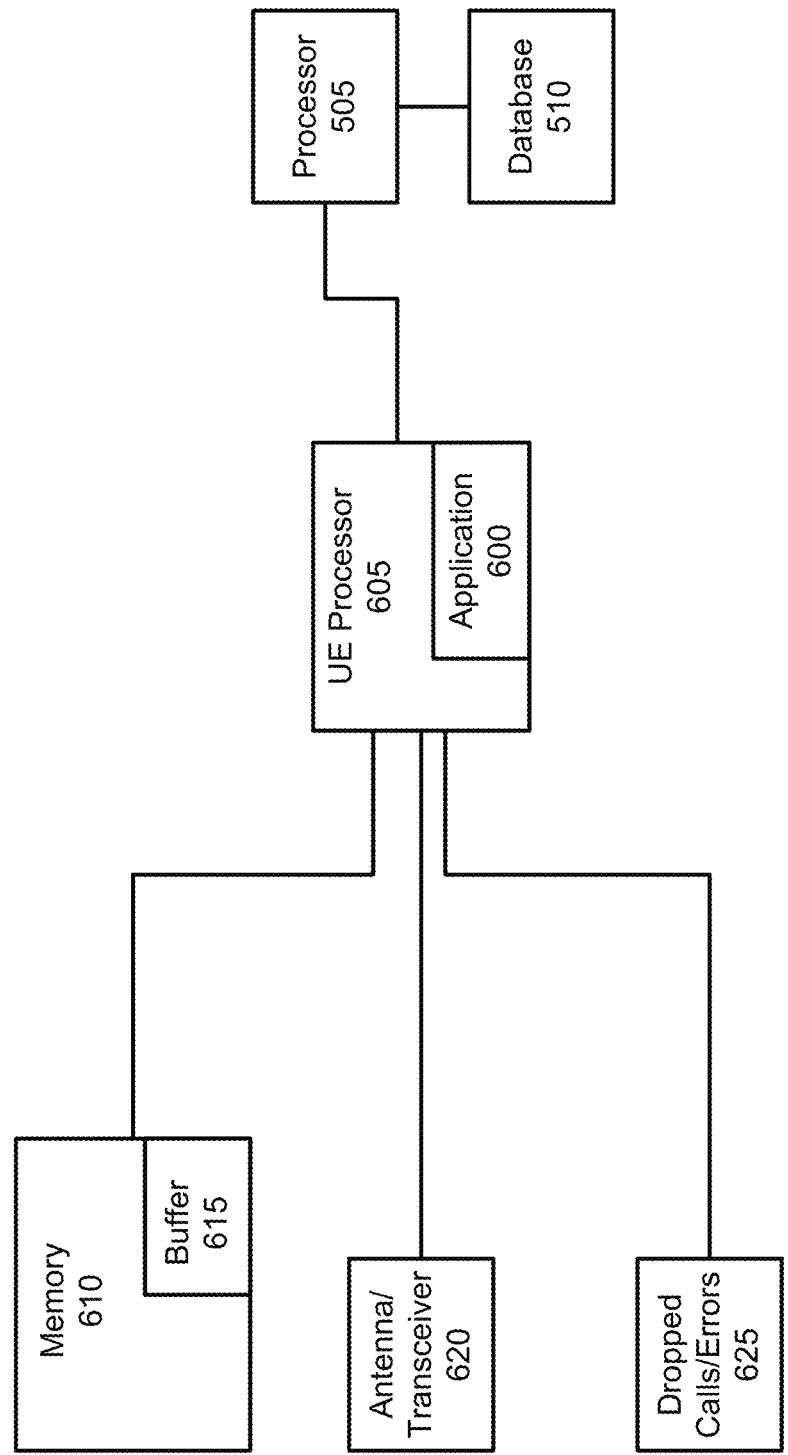
FIG. 6 is a system diagram for a user equipment (UE) performance application, in accordance with some examples of the present disclosure.
Figure 7A:
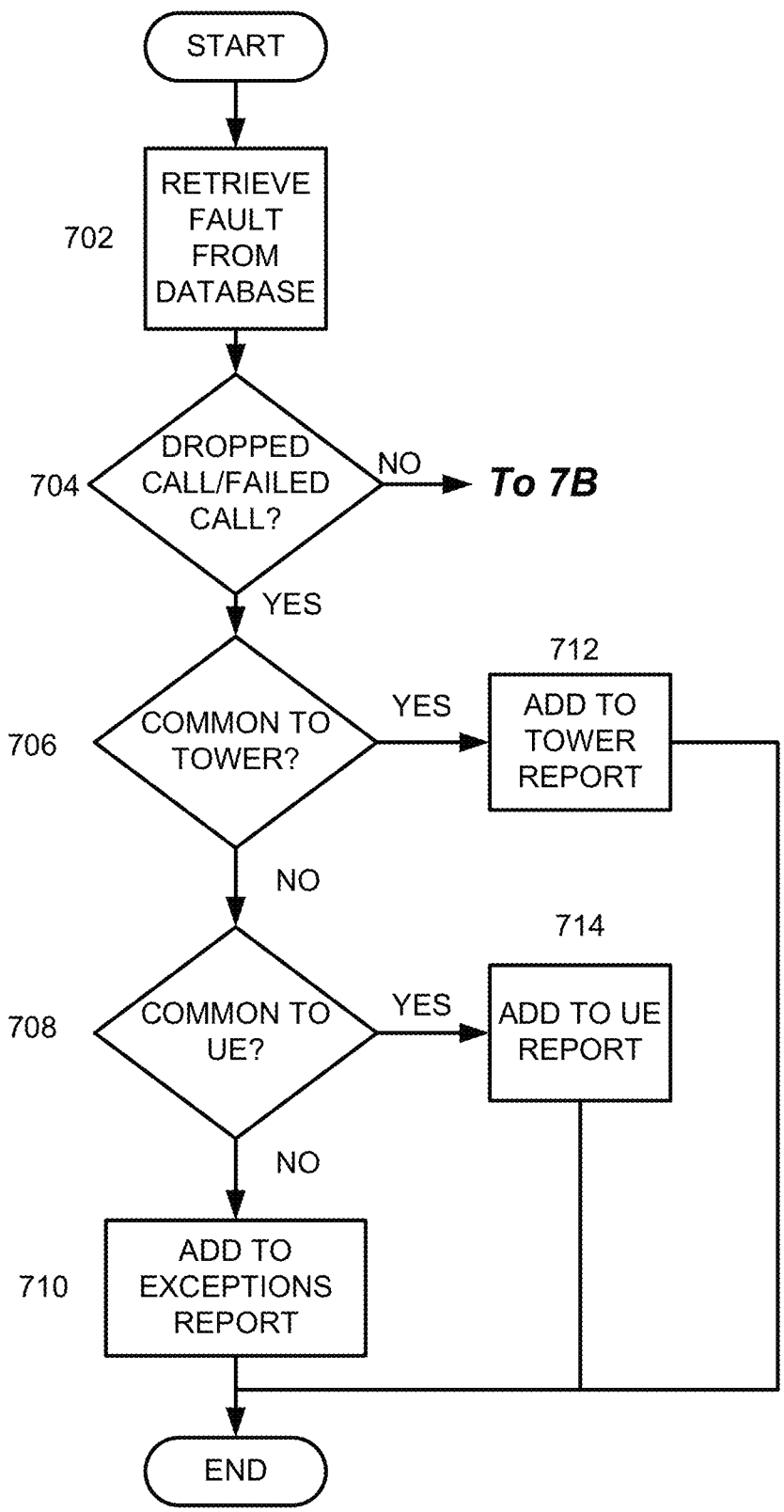
FIGS. 7A and 7B are a flowchart depicting a method for locating and reporting network, user equipment (UE), and application faults, in accordance with some examples of the present disclosure.
Figure 7B:
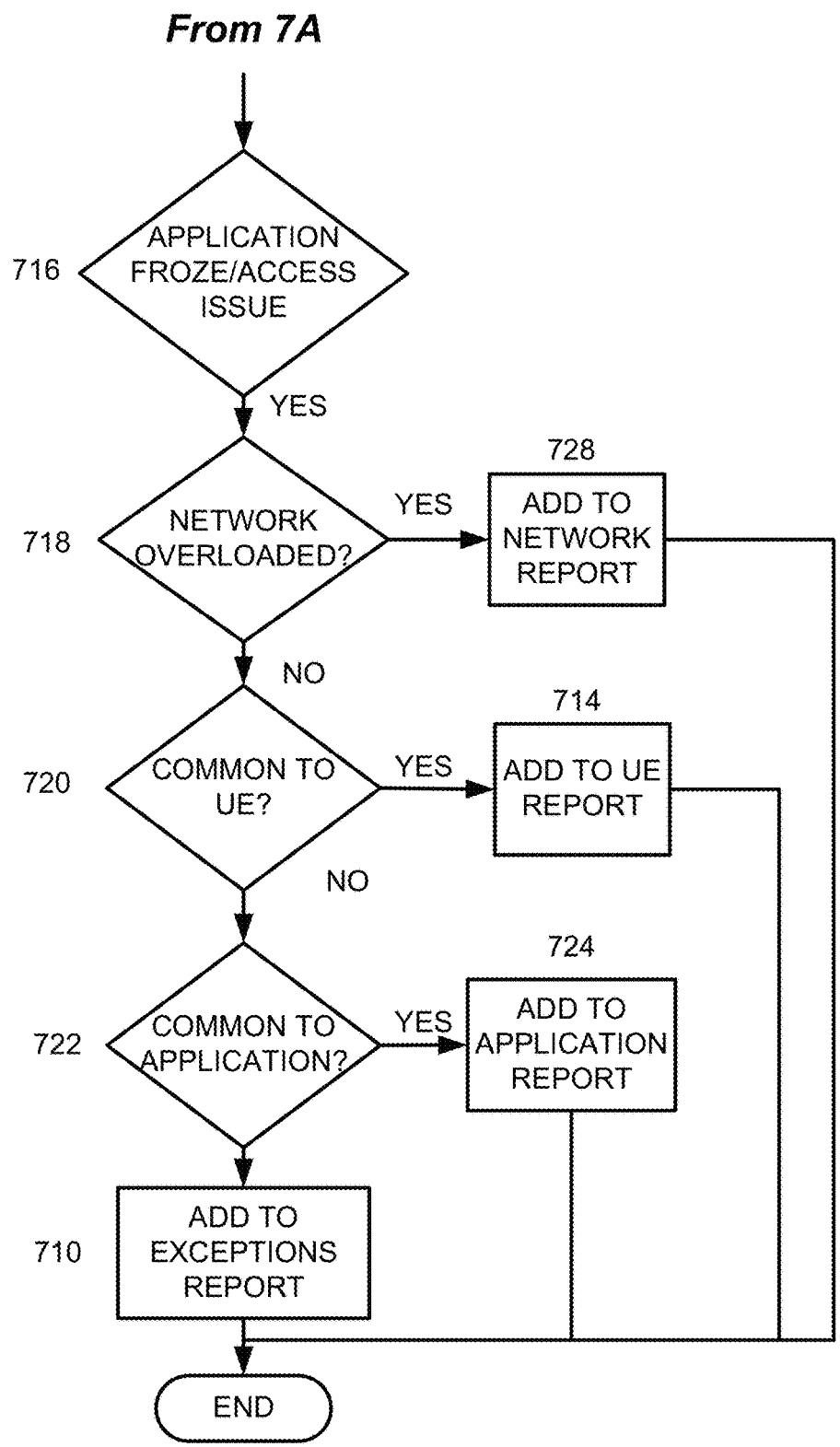

In other examples, as shown in FIG. 4B, the system 450 can provide a more high level view of system performance. In other words, some users may be uninterested in why a particular application is running slowly, but simply want to know that it is running slowly. The user may not care when they see a particular video, for example, or need immediate status updates from a social networking site. In the stadium example, for example, rather than opening a social networking site only to be frustrated by the slow response and upload times, the user can simply glance at their home screen 452. On the home screen 452, standard application icons 465 can be supplemented with indicia of how that application is predicted to perform currently, whether due to network, application, or UE issues. The application performance predictors 455 can comprise, for example and not limitation, colored indicators 455a (e.g., red, yellow, and green lights), check marks and x's 455b, or gauges (e.g., an application speedometer overlay 455c). As above, the application performance predictors 455 can combine QoS metrics related to measured network performance with, for example, data from UE applications and user input.

In some embodiments, the GUI 400 can utilize real-time user input regarding current QoE for various applications and networks. So, for example, if a plurality of users are in the aforementioned stadium and one or more of them reports slow performance for Application A, for example, this data can be integrated into the application performance predictors 455. Similarly, issues reported by application providers (e.g., server outages) can also be included to provide accurate predictions of a user's likely QoE.

In some examples, the application performance predictors 455 can also include an application issue indicator 460. In other words, in addition to providing information about the performance of a particular application, the application issue indicator 460 can also provide information about the current bottleneck by providing letters or symbols, for example, indicative of various system components. If, for example, Application A is slow because of issues with the Application itself (e.g., the network content provider reports a denial of service attack to the system), the issue indicator can display a "P" 460a for "provider." If, on the other hand, the issue is with the 4G LTE network (e.g., the cellular provider reports tower issues), for example, the issue indicator can display a "4G" or "N" 460b for network. This can enable the user to try other available networks (e.g., 3G), if available, or simply wait for the issue to clear. Similarly, if the UE 415 is the issue, the issue indicator can display "UE Issue," 460c, or similar. This may prompt the user to check the GUI 400 dashboard to see if the problem can be easily rectified (e.g., with a restart) on the UE 415. Of course, the issue may be caused by the application itself. In this case, the issue indicator can comprise an "A" 460d, for example, for application, or similar.

In still other examples, the system 450 may be unable to identify the issue, or there may be multiple contributing factors. In this scenario, the system 450 can display a question mark 460b, for example. The user can then wait to see if the issue(s) resolves itself, check the GUI 400 dashboard, restart the UE, or call technical support, if desired. In some examples, applications that are predicted to be working nominally can be indicated with a check mark 455b, or can simply have the application icon 465—i.e., with no indicia (indicating that there are no problems).

Examples of the present disclosure can also comprise a system 500 for monitoring and analyzing the entire QoE domain, including QoS metrics. In some examples, the system 500 can comprise a processor 505 for receiving a plurality of inputs and generating a plurality of outputs. In some examples, the processor 505 can comprise a computer processor, laptop, tablet, application specific integrated circuit (ASIC), or field programmable gate array (FPGA).

The processor 505 can receive data from a number of sources to provide improved overall system analysis. The processor 505 can receive data, for example, from application providers 515, which can include applications like, for example and not limitation, Twitter, Facebook, Instagram, and YouTube. The application providers 515 can provide information about how users access their applications, locations of use, and other metrics. This can enable the system 500 to identify issues caused by the applications or application providers themselves, as opposed to network, or other, issues.

Similarly, in some examples, the processor 505 can receive data from an application 520 on the UE, as discussed below. The application 520 can compile data from the UE itself including, but not limited to, signal strength, location, processor, buffer, and memory usage, talk time, internet connection time, download speeds, and data usage. This can enable the system 500 to identify issues caused by the UE, as opposed to other factors. If the user is a gamer, for example, and the UE application 520 consistently reports high processor usage and/or high latency from the UE application 520, the system 500 can determine that the UE is a possible bottleneck, which may be addressed with a new phone, for example.

The processor 505 can also receive data from one or more internet service providers (ISPs) 525. The ISP data 525 can provide information about UE internet data usage (e.g., on WLAN connections), internet provider network traffic and speeds, and overall internet speeds (e.g., the internet itself may actually slow down due to heavy usage). ISP data 525 can enable the system 500 to identify ISP bottlenecks, average speeds for ISPs, reliability, etc. This can enable the system 500 to identify ISPs with and without network issues. This can lead to partnerships with those ISPs that provide the best service, for example.

The processor 505 can also receive data from one or more cellular providers 530. Cellular providers 530, such as T-Mobile, can provide information about cellular system traffic and loads, network downtime, maintenance, and user profiles. User profiles can include, for example and not limitation, UE, location usage, and cell tower network usage (e.g., 3G vs. 4G LTE). This can enable the system 500 to quickly identify problems with cellular providers.

In addition, the system 500 can also utilize conventional network (QoS) metrics 535. The QoS metrics 535 can be used to identify network-side factors such as, for example, network bandwidth, response times, handover times, and usage. If the QoS metrics 535 indicate that a portion of the network has consistently high usage rates, for example, additional bandwidth capacity may be needed for that portion of the network. This may be because that portion of the network is located in a particularly populous area (e.g., Manhattan) or because that portion is in an area of higher than normal usage (e.g., Silicon Valley).

The processor 505 can also receive data directly from users. In some examples, for example, user's e-mails, phone calls, and other contacts with service providers 570 may be included. So, for example, if a user sends an e-mail or contacts a help desk, data related to the user's issue can be included. In some examples, the system 500 can also include an online application 575, an application on the UE 580, a survey, or other means for gathering data from users. The application 575 can include questions regarding a user's perceived QoE (i.e., regardless of the raw data). Thus, if a user is not satisfied with their service, a technical problem can be identified based on the QoS data. If no technical problem can be identified, the system 500 can initiate a call to the user, for example, to identify possible user or setting issues. If a user is not satisfied with an application simply because he cannot figure out how to use it, for example, these issues can be addressed before the issue escalates and/or the user switches carriers.

In some examples, the processor 505 can compile the combined data (QoE and QoS data) into a database 510. In some examples, the database 510 can contain data for both normal system operations (i.e., when the number of dropped calls, errors, delays, etc. is nominal) and data for system faults. In some examples, the processor 505 can identify and label database entries (i.e., either nominal data points or fault data points). The database 510 can then be used, for example, to generate the aforementioned performance map 300, among other things.

Because of the level of detail provided by the system 500, the map 300 can contain multiple layers of data regarding predicted network performance, ISP performance, and UE performance, among other things. Thus, the map 300 can be used at multiple levels. The map 300 can be used by cellular users, for example, to determine what types of networks are available at home or at work to predict performance, identify issues, and provide solutions, as applicable. Cellular providers can use the map 300 to identify current, and predict future, areas of poor reception, areas of high usage, and/or to provide alternatives to customers. Application providers and ISPs can use the map to identify users for technical and marketing purposes, among other things.

The database 510 can also be used to identify and/or predict issues that would not otherwise be recognizable. Because the database 510 include data from both the QoS and QoE sides of the cellular system including the cellular provider, network, applications, and the user; issues caused by particular UE, applications, or cell towers, for example, can be quickly identified. In addition, the database 510 can be mined to identify potential future issues and provide location specific QoE predictors. If, for example, a particular user has an increase in data usage, for example, this may expose a weakness in the user's connection that was not previously apparent. The database 510 can predict the issue and, in some examples, offer an alternative, fixing the issue proactively (or at least more quickly). These types of proactive measures taken by service providers create strong customer loyalty.

Using only QoS data, for example, could indicate that a particular cell tower is dropping a disproportionate number of calls. This could lead the provider to conclude that the tower has, for example, a defective antenna or other issue. If a particular type of UE (e.g., Device A) drops all (or most) of the calls on that particular cell tower, however, the system 500 can identify the problem as the UE and not the tower from the UE application 520, cellular provider 530, or combinations thereof. This data can be provided to the cell phone manufacturer, for example, to prompt a software fix, if applicable. Without QoE data for comparison, conventional QoS metrics would not detect, let alone pinpoint, this problem.

The conglomeration of data from the system 500 in the system database 510 can enable further analysis and predict future performance. So, for example, if all, or almost all, of Device A drop calls in a particular area, but other models of phones do not, the problem can likely be narrowed to the type of phone. This can enable analysis of software or system settings, for example, in an attempt to locate a solution. If necessary, a software update can be implemented to fix the issue. In some cases, the system 500 may recommend a different UE to avoid these issues.

In some examples, the problem may occur in 4G mode, for example, but not in 3G mode. If a user may make predominately voice calls, therefore, switching to the 3G network in that cell (if available) may be a viable alternative. Of course, it is possible that local conditions are such that the problem cannot be easily resolved. For a customer that lives or works in a cell that is overloaded or has difficult geography (e.g., mountainous terrain), therefore, the solution may be to offer the user a WLAN router to enable the user to access VOIP and data via a WLAN connection. Alternatively, if the problem is unique to the phone, the solution may be to offer the user a different model phone (at little or no cost, if necessary).

Examples of the present disclosure can also comprise an application 600 for tracking one or more onboard UE functions. In some examples, for example, the application 600 can run on the processor 605 of the UE and receive various inputs from the UE. The application 600 can receive inputs from the UE memory 610 and/or memory buffer 615, for example. This can enable the application 600 to monitor, for example, instant and average buffer 615 usage, actual download speeds (as opposed to those provided on the QoS side), application response times, etc. If the user watches a lot of internet video content, for example, a larger page file or UE with greater memory capacity may be warranted. Similarly, in some examples, the application 600 can receive inputs from the processor 605 of the UE. This can enable the application 600 to monitor, for example, instant and average processor 605 usage, response times, processing times, etc. If the user is a gamer, for example, a faster processor may be warranted to limit freezing and/or produce smoother graphics.

In some examples, the application 600 can also log internal errors and dropped calls 625. As mentioned above, QoS monitoring may be unable to detect a dropped call during certain conditions (e.g., the user immediately hangs up after hearing the call drop). In contrast, monitoring dropped calls and error rates 625 from the UE-side can enable the application 600 to log dropped calls that may otherwise go unnoticed. Comparing QoS data with UE side data 625, for example, can enable providers to pinpoint potential problems—i.e., to determine if it is a problem with the network or the UE. The dropped calls 625 could be the result because of UE issues (e.g., manufacturing or software issues), for example, or a faulty cell tower, which may not be easily detectable using other means.

In some examples, the application 600 can also receive inputs from the UEs transceiver 620 or antenna system. This can enable the application 600 to log information regarding signal strength, error rates, ping times, and other data. This data can be used for the performance map 300, to identify faulty cell towers, and to identify faulty antennas and transceivers 620. As before, if a particular type of UE shows atypical reception in a certain area, the antenna design of the UE (among other things) may be the culprit. Of course, if all UEs on a certain tower show lower than expected signal, then the tower may have a ground fault, power issues, or failing transmitter, for example.

Examples of the present disclosure can also comprise a method 700 for analyzing and locating network bottlenecks. As mentioned above, traditional QoS systems do not encompass the entire cellular/wireless system. As a result, QoS systems may be unable to correct some systemic problems because they do not see them. In other words, if the problem is that a user requires a UE with a faster processor because of his usage patterns, for example, a QoS system, which only looks at network performance, is unable to identify this problem. What is needed, therefore, is a method 700 that combines QoS network data with QoE data from UEs, internet content providers, and other sources to locate and resolve network bottlenecks.

In some examples, therefore, the method 700 can comprise retrieving faults from the database 510 for further analysis, as shown at 702. Faults can be, for example and not limitation, drop calls, dropped data packets, delays, and rebuffering. Because there are multiple types of faults, therefore, the method 700 can continue by identifying the type of fault, as shown at 704. If the fault is a dropped call 704, for example, the method 700 can determine if the cell tower associated with the fault has a higher than normal dropped call rate, a weak signal, or other problem, as shown at 706. This can enable the system to identify faulty towers and to generate a tower report, as shown at 712. The tower report 712 can enable the cellular provider to address maintenance issues with the tower to return it to nominal operation.

If, on the other hand, the tower has a normal error rate, the method 700 can determine if the particular UE has a higher than normal dropped call rate, a weak signal, or other problem, as shown at 708. If the UE has a higher than normal drop rate, for example, the system can create a UE report, as shown at 714. The UE report 714 can be provided to cellular providers and/or cellular manufacturers. The UE report 714 can also be cross-referenced against data from the application 600 to identify a possible faulty component (e.g., a bad batch of transceivers). This can enable the system to provide suggestions as to a possible resolution to the problem. If the problem is a hardware problem, as with a faulty transceiver, the solution may be to replace the UE. If the problem does not appear to be hardware related, additional analysis may be needed to locate software, or other, problems.

If the problem does not appear to be UE or tower related, the method 700 can add the fault to an exceptions report for further analysis, as shown at 710. If, for example, a particular user's UE—as opposed to a particular type of UE—shows up repeatedly in the exceptions report 710, for example, the fault may be the UE itself.

Similarly, the method 700 may also determine that the fault is an application related issue (e.g., freezing, failing to open, or having access issues), as shown at 716. If so, the method 700 can identify whether any network issues existed at the time of the fault, as shown at 718. Network issues 718 could arise from cellular network issues, such as overloading, which can generally be derived from conventional QoS metrics 535. Network issues 718 can also arise from internet issues, which can be identified from ISP data 525 discussed above. If the network is determined to be the problem, the fault can be added to a network report 728, which may be divided between cellular and internet issues, for example.

If the fault is caused by a football game, as in the stadium scenario, in some examples, the cellular provider may decide to install more access points at the stadium, for example. In other examples, the cellular provider may do nothing because it is not a prudent capital investment because of the sporadic use. If a particular portion of the network, either cellular or internet, repeatedly shows up on the network report 728, however, it may be desirable to increase the number of access points, upgrade access points, or install larger internet connections (e.g., larger trunk lines in that location).

If, on the other hand, the network was operating nominally at the time of the fault, the method 700 can determine if the particular UE has a higher than normal fault rate overall, as shown at 720. If the UE has a higher than normal fault rate, for example, the system can create a UE report, as shown at 714. The UE report 714 can be provided to cellular providers and/or cellular manufacturers. The UE report 714 can also be cross-referenced against data from the application 600 to identify a possible faulty or outdated component.

This can enable the provider to offer suggestions as to a possible solution to the problem. If the application is freezing because of inadequate processor power or memory, this issue can be located by referring to the application 600. If the processor was overloaded at the time of the fault, for example, the solution may be to replace the UE with a product with a more powerful processor. If the problem does not appear to be hardware related, but is common to a particular type of UE, additional analysis may be needed to locate software conflicts, or other, problems.

If the fault is not common to a particular type of UE, the method 700 can determined if the problem is the application itself, as shown at 722. The application 722 may simply have buggy code that does not run well regardless of the UE. In some instances, the application 722 may represent a security vulnerability, and the faults may be caused by a virus or other malware. In this case, providers may decide to report the application to, for example, the application publisher, advise users not to use the application, or remove the application from UEs and online application stores. The method 700 can add applications that repeatedly cause faults to an application report, as shown at 724, which can be supplied to cellular providers, content providers, and the publisher, among other things.

If the problem does not appear to be network, UE, or application related, the method 700 can add the fault to an exceptions report for further analysis, as shown at 710. The method 700 can enable system faults to be located even when they are outside conventional QoS systems. The method 700 can enable the location, often in a proactive manner, of problems, which can also lead to the solution. The method 700 can enable providers to provide customers with a better QoE, increasing customer loyalty and retention and reducing costs associated with customer service and technical support, among other things.

While several possible examples are disclosed above, examples of the present disclosure are not so limited. For instance, while a systems and methods for use with cellular phone systems has been disclosed, other systems or subsystems could be analyzed in a similar manner without departing from the spirit of the disclosure. In addition, the location and configuration used for various features of examples of the present disclosure such as, for example, the order of steps, the types of cellular technologies, and the components monitored can be varied according to a particular network or application that requires a slight variation due to, for example, the size or construction of the network, the communication protocols, or the UEs used. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A computing device comprising:
a display comprising a graphical user interface (GUI);
one or more processors;
one or more memory chips;
one or more transceivers, including one or more antennas, to send and receive wired communications, wireless communications, or both wired and wireless communications; and
an application stored in the one or more memory chips and executable by the one or more processors to:
receive, from the one or more transceivers, a first set of data from a network database related to one or more quality of service (QoS) metrics;
receive, from the one or more transceivers, a second set of data submitted by one or more users including one or more quality of user experience (QoE) metrics;
combine, with the one or more processors, the first set of data and the second set of data into combined data;
associate, with the one or more processors, the combined data with a plurality of geographic locations;
determine a device type of the computing device; and
present, on the GUI, a plurality of representations of geographic locations and one or more indicators corresponding to one or more of the plurality of representations of geographic locations related to the one or more of the QoE metrics and the QoS metrics, wherein at least one indicator of the one or more indicators is presented based at least in part on the device type.

2. The computing device of claim 1, wherein the plurality of representations of geographic locations correspond to one or more of houses, businesses, and public use areas.

3. The computing device of claim 1, wherein a first indicator of the one or more indicators comprises one or more network performance predictors for predicting QoE metrics related to one or more different network types.

4. The computing device of claim 3, wherein a first network performance predictor of the one or more network performance predictors further comprises an indication of a first network issue associated with a first network.

5. The computing device of claim 4, wherein the first network issue a relates to a distance from a first geographical location to a source of the first network.

6. The computing device of claim 4, wherein the first network issue relates to a first geographical location.

7. The computing device of claim 3, wherein the one or more network performance predictors are associated with one or more of: a 2G cellular network, a 3G cellular network, a 4G LTE cellular network, a land-line based telephony network, Internet, or a wireless local area network (WLAN).

8. A method, performed by a device, comprising:
receiving a first set of data from a network database related to one or more quality of service (QoS) metrics;
receiving a second set of data submitted by one or more users including one or more quality of user experience (QoE) metrics;
combining the first set of data and the second set of data into combined data;
associating the combined data with a plurality of geographic locations;
determining a device type of the device;
displaying, on a GUI of the device, a plurality of representations of geographic locations and one or more indicators corresponding to one or more of the plurality of representations of geographic locations related to the one or more of the QoE metrics and the QoS metrics, wherein at least one indicator of the one or more indicators is presented based at least in part on the device type.

9. The method of claim 8, wherein the plurality of representations of geographic locations correspond to one or more of houses, businesses, and public use areas.

10. The method of claim 8, wherein a first indicator of the one or more indicators comprises one or more network performance predictors for predicting QoE metrics related to one or more different network types.

11. The method of claim 10, wherein a first network performance predictor of the one or more network performance predictors further comprises an indication of a first network issue associated with a first network.

12. The method of claim 11, wherein the first network issue relates to a distance from a first geographical location to a source of the first network.

13. The method of claim 11, wherein the first network issue relates to a type of the device.

14. The method of claim 8, further comprising:
receiving an address associated with a first geographical location; and
displaying, on the GUI, feedback associated with a network performance of one or more network types associated with the first geographical location.

15. A system comprising:
a computing device including:
   a display comprising a graphical user interface (GUI);
   one or more processors;
   one or more memory chips;
   one or more transceivers, including one or more antennas, to send and receive wired communications, wireless communications, or both wired and wireless communications; and
   an application stored in the one or more memory chips and executable by the one or more processors to:
     receive a first set of data from a network database related to one or more quality of service (QoS) metrics;
     receive a second set of data submitted by one or more users including one or more quality of user experience (QoE) metrics;
     combine the first set of data and the second set of data into combined data;
     associate the combined data with a plurality of geographic locations;
     receive an address associated with a geographic location of the plurality of geographic locations; and
     present, on the GUI, feedback associated with a network performance of one or more network types associated with the geographic location, the feedback being related to the combined data and including a list of the one or more network types and an indication of which of the one or more network types are available at the geographic location.

16. The system of claim 15, further comprising presenting, on the GUI, a plurality of representations of geographic locations and one or more indicators corresponding to one or more of the plurality of representations of geographic locations related to the one or more of the QoE metrics and the QoS metrics, wherein the plurality of representations of geographic locations correspond to one or more of houses, businesses, and public use areas.

17. The system of claim 16, wherein a first indicator of the one or more indicators comprises one or more network performance predictors for predicting QoE metrics related to one or more different network types.

18. The system of claim 17, wherein a first network performance predictor of the one or more network performance predictors further comprises an indication of a first network issue associated with a first network.

19. The system of claim 18, wherein the first network issue relates to a distance from a first geographical location to a source of the first network.

20. The system of claim 16, further comprising:
determining a device type of the computing device; and
determining a first indicator of the one or more indicators to present based at least in part on the device type.

* * * * *